(12) United States Patent
Han

(10) Patent No.: US 9,641,414 B2
(45) Date of Patent: May 2, 2017

(54) APPARATUS AND METHOD FOR TRANSMITTING CONTROL PACKET IN BROADBAND COMMUNICATION NETWORK

(75) Inventor: Kyung-Wan Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1813 days.

(21) Appl. No.: 12/689,385

(22) Filed: Jan. 19, 2010

(65) Prior Publication Data

US 2010/0182927 A1 Jul. 22, 2010

(30) Foreign Application Priority Data

Jan. 20, 2009 (KR) ........................ 10-2009-0004422

(51) Int. Cl.
*H04L 12/26* (2006.01)
*H04L 29/06* (2006.01)

(52) U.S. Cl.
CPC .............. *H04L 43/10* (2013.01); *H04L 69/16* (2013.01)

(58) Field of Classification Search
CPC ...................................................... H04L 69/16
USPC ................................................. 370/231, 252
See application file for complete search history.

(56) References Cited

U.S. PATENT DOCUMENTS

| 2003/0128676 A1 | 7/2003 | Lee |
| 2006/0087995 A1* | 4/2006 | Nago ............................ 370/310 |
| 2006/0182141 A1* | 8/2006 | Duggirala et al. ............ 370/465 |
| 2009/0003208 A1* | 1/2009 | Payyappilly et al. ..... 370/230.1 |

FOREIGN PATENT DOCUMENTS

| KR | 10-2003-0060491 A | 7/2003 |
| KR | 10-2005-0109690 A | 11/2005 |
| KR | 10-2006-0061524 A | 6/2006 |

* cited by examiner

*Primary Examiner* — Mark Rinehart
*Assistant Examiner* — Matthew Hopkins
(74) *Attorney, Agent, or Firm* — Jefferson IP Law, LLP

(57) ABSTRACT

An apparatus and a method for transmitting a control signal for determining a keep alive status of a counterpart node in a broadband communication network are provided. When a period for determining a keep alive status of the counterpart node to which a data is connected arrives, whether traffic is received from the counterpart node is determined. If it is determined that the traffic is received from the counterpart node, the keep alive status of the counterpart node is determined using the traffic received from the counterpart node. If it is determined that the traffic is not received from the counterpart node, a request signal for determining the keep alive status of the counterpart node is transmitted to the counterpart node.

20 Claims, 3 Drawing Sheets

APPARATUS AND METHOD FOR TRANSMITTING CONTROL PACKET IN BROADBAND COMMUNICATION NETWORK

PRIORITY

This application claims the benefit under 35 U.S.C. §119(a) of a Korean patent application filed in the Korean Intellectual Property Office on Jan. 20, 2009 and assigned Serial No. 10-2009-0004422, the entire disclosure of which is hereby incorporated by reference.

BACKGROUND OF THE INVENTION

1. Field of the Invention

The present invention relates to an apparatus and a method for transmitting a control packet in a broadband Wide Area Network (WAN). More particularly, the present invention relates to an apparatus and a method for preventing a link from failing due to a loss of a control packet in a broadband WAN.

2. Description of the Related Art

A protocol for controlling a data link of a broadband communication network repeatedly determines an operation status of a counterpart node via a keep alive process.

In the case of performing the keep alive process, a node including a protocol for controlling a data link transmits a keep alive control frame for determining an operation status of a counterpart node to which a data link is connected to the counterpart node. At this point, the counterpart node transmits a response signal to the node in response to the keep alive control frame only if traffic is transmittable/receivable.

When receiving a response signal from the counterpart node in response to the keep alive control frame, the node including the protocol recognizes that the counterpart node can transmit/receive traffic. Therefore, the node including the protocol transmits/receives traffic to/from the counterpart node via the data link.

In contrast, when not receiving a response signal from the counterpart node in response to the keep alive control frame, the node including the protocol retransmits a keep alive control frame. When not successively receiving a response signal in response to a keep alive control frame, the node including the protocol determines that the counterpart node cannot transmit/receive traffic, and shuts down the link with the counterpart node.

When a channel status is not good and a keep alive control frame is lost, the node including the protocol cannot receive a response signal in response to the keep alive control frame. Therefore, the node including the protocol shuts down a link with the counterpart node even when the counterpart node can transmit/receive traffic.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for preventing a control packet from being lost in a broadband communication network.

Another aspect of the present invention is to provide an apparatus and a method for preventing a link from failing due to a loss of a control packet used for a keep alive process in a broadband communication network.

Still another aspect of the present invention is to provide an apparatus and a method for suspending transmission of a control packet used for a keep alive process while a signal is received from a counterpart node to which a data link is connected in a node including a protocol for controlling the data link in a broadband communication network.

In accordance with an aspect of the present invention, a method for transmitting a control signal for determining a keep alive status of a counterpart node in a broadband communication network is provided. The method includes when a period for determining a keep alive status of the counterpart node to which a data link is connected arrives, determining whether traffic is received from the counterpart node, when the traffic is received from the counterpart node, determining the keep alive status of the counterpart node using the traffic received from the counterpart node, and when the traffic is not received from the counterpart node, transmitting a request signal for determining the keep alive status of the counterpart node to the counterpart node, wherein when the keep alive status of the counterpart node is determined using the traffic, the request signal is not transmitted to the counterpart node.

In accordance with another aspect of the present invention, an apparatus for transmitting a control signal for determining a keep alive status of a counterpart node in a broadband communication network is provided. The apparatus includes a transmission/reception interface for transmitting/receiving traffic to/from the counterpart node to which a data link is connected, a traffic determination unit for determining whether traffic is received from the counterpart node, and a controller for, when the traffic is received from the counterpart node, determining a keep alive status of the counterpart node using the traffic received from the counterpart node, and when the traffic is not received from the counterpart node, controlling to transmit a request signal for determining the keep alive status of the counterpart node to the counterpart node, wherein when determining the keep alive status of the counterpart node using the traffic, the controller controls not to transmit the request signal to the counterpart node.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for preventing a link from failing due to a loss of a control packet in a broadband Wide Area Network (WAN).

In a broadband communication network, a node including a protocol for controlling a data link periodically determines a keep alive status of a counterpart node while a data link of the counterpart node is connected. For example, the node including the protocol periodically transmits an echo request frame to the counterpart node in order to determine whether the counterpart node can transmit/receive traffic.

Figure 1:
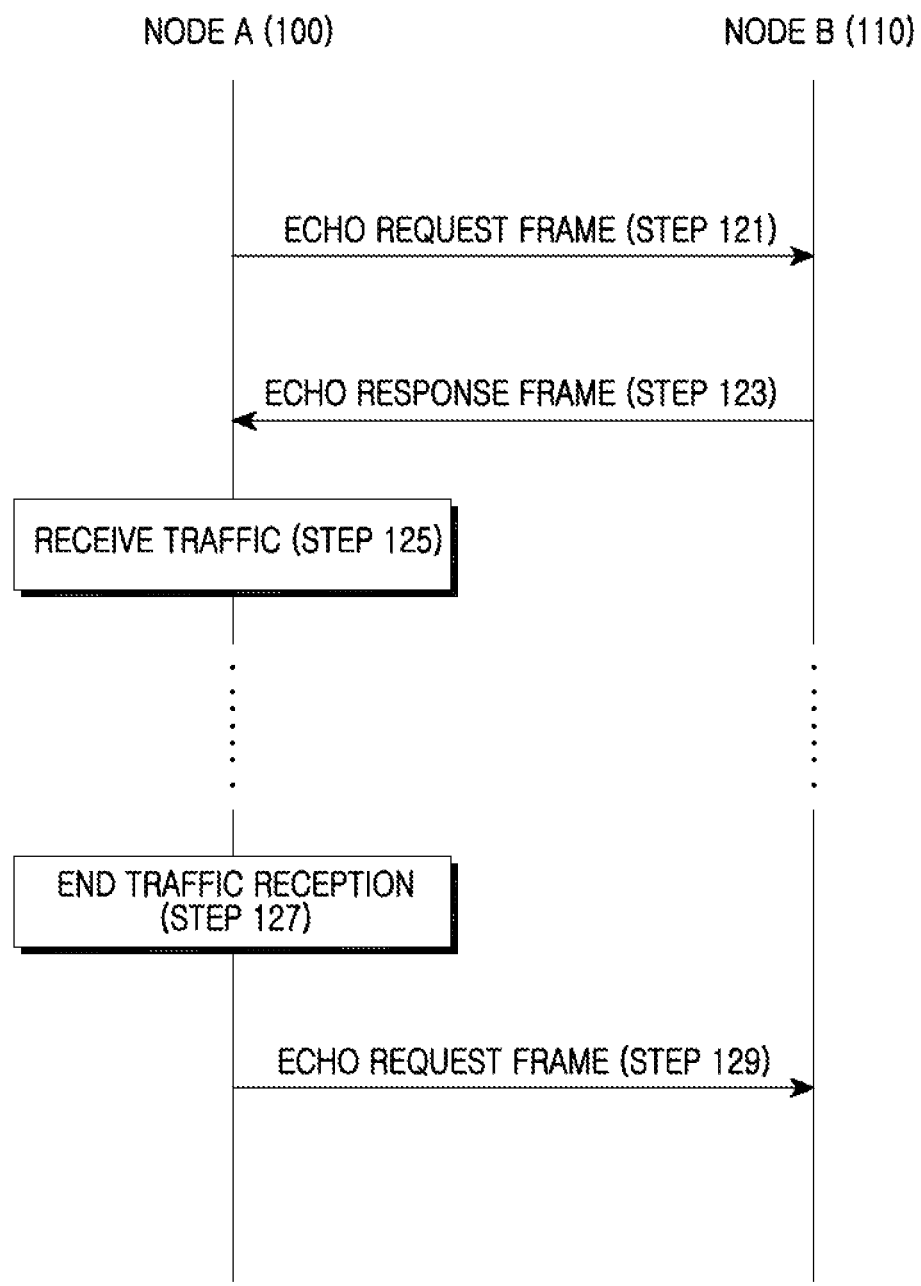
FIG. 1 is a view illustrating a procedure for transmitting a control packet in a broadband communication network according to an exemplary embodiment of the present invention.

In addition, when receiving a data packet from the counterpart node to which the data link is connected, the node including the protocol for controlling the data link can recognize that the counterpart node can transmit/receive traffic. Accordingly, when receiving the data packet from the counterpart node, the node including the protocol does not need to transmit an echo request frame for determining a keep alive status of the counterpart node as illustrated in FIG. 1. Here, the node including the protocol and the counterpart node denote Layer 2 (L2) equipment such as a router, a switch and the like.

FIG. 1 is a view illustrating a procedure for transmitting a control packet in a broadband communication network according to an exemplary embodiment of the present invention. In the following description, it is assumed that a node A 100 and a node B 110 include a protocol for controlling a data link.

Referring to FIG. 1, when a data link of the node A 100 and the node B 110 is set, the node A 100 determines a keep alive status of the node B 110, and the node B 110 determines a keep alive status of the node A 100. At this point, the operations of the node A 100 and the node B 110, for determining a keep alive status of a counterpart node, are the same. Accordingly, an operation for determining a keep alive status of the node B 110 at the node A 100 is representatively described, and description of an operation for determining a keep alive status of the node A 100 at the node B 110 is omitted.

When determining a keep alive status of the node B 110, the node A 100 determines whether a data packet is received from the node B 110.

If it is determined that a data packet is not received from the node B 110, the node A 100 transmits an echo request frame to the node B 110 in order to determine a keep alive status of the node B 110 in step 121. After that, the node A 100 periodically transmits an echo request frame to the node B 110.

When receiving an echo request frame, the node B 110 determines whether traffic is transmittable/receivable via the data link with the node A 100. If it is determined that the traffic is transmittable/receivable via the data link with the node A 100, the node B 110 transmits an echo response frame to the node A 100 in step 123.

In the case where the node A 100 receives a data packet from the node B 110 when a period at which an echo request frame is to be transmitted arrives in step 125, the node A 100 may recognize that the node B 110 can transmit/receive traffic. Accordingly, the node A 100 does not transmit an echo request frame for determining keep alive status information of the node B 110 while receiving a data packet from the node B 110.

When reception of a data packet from the node B 110 ends in step 127, the node A 100 cannot determine a keep alive status of the node B 110. Therefore, the node A 100 transmits an echo request frame to the node B 110 in order to determine the keep alive status of the node B 110 in step 129.

As described above, the node A 100 does not transmit an echo request frame for determining the keep alive status of the node B 110 while receiving a data packet from the node B 110. Therefore, the node A 100 can prevent the data link with the node B 110 from failing unnecessarily due to a loss of an echo request frame.

Figure 2:
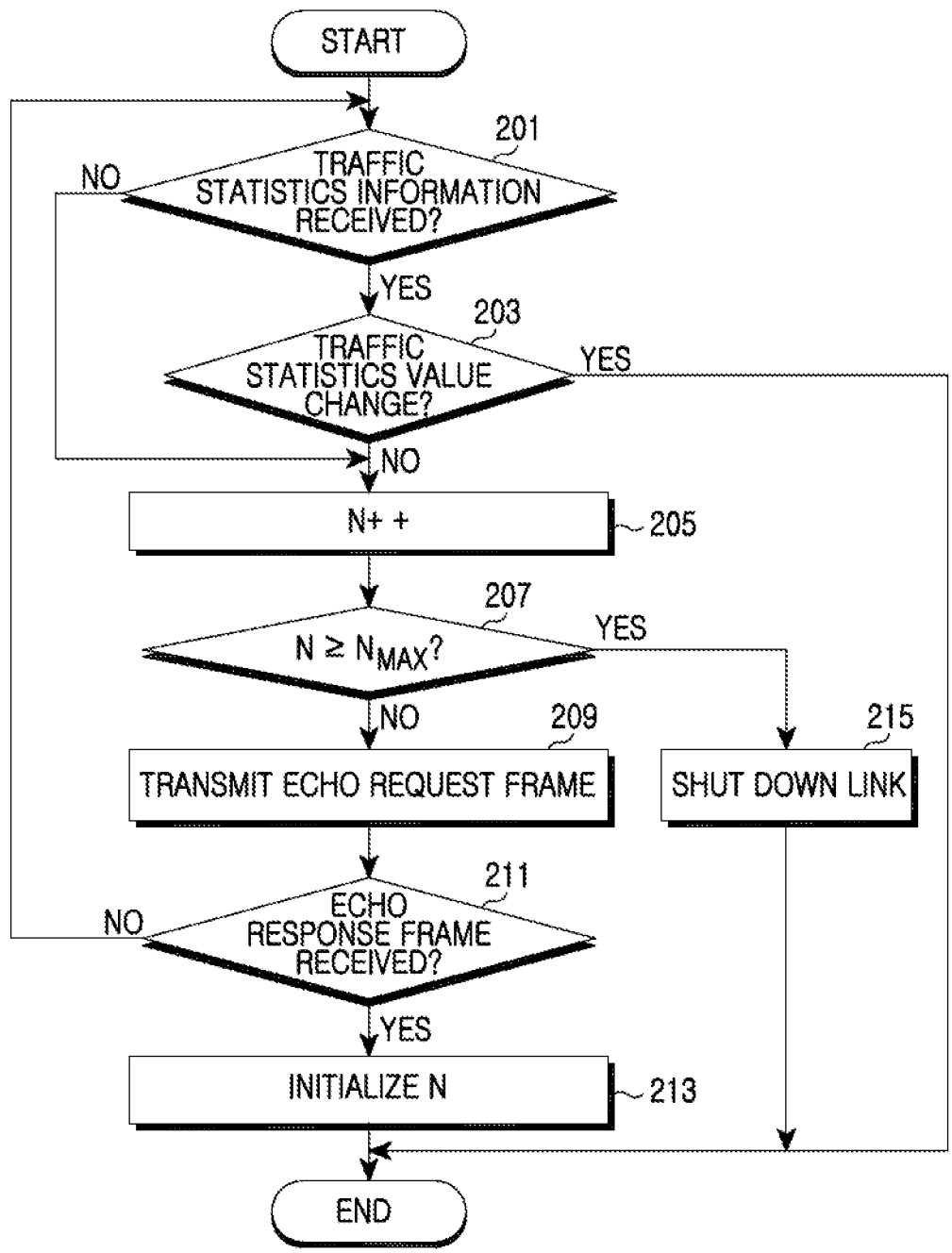
FIG. 2 is a view illustrating a procedure for controlling transmission of a control packet in a node of a broadband communication network according to an exemplary embodiment of the present invention.

The node A 100 may determine the keep alive status of the node B 110 using statistics information of interfaces provided from the node B 110 as illustrated in FIG. 2.

FIG. 2 illustrates a procedure for controlling transmission of a control packet in a node of a broadband communication network according to an exemplary embodiment of the present invention.

Referring to FIG. 2, when a period for determining a keep alive status of a counterpart node to which a data link is connected arrives, a node including a protocol for controlling a data link determines whether statistics information of interfaces is received from the counterpart node in step 201. Here, the statistics information denotes information transmitted for Performance Monitoring (PM) by nodes.

If it is determined in step 201 that the statistics information of the interfaces is not received from the counterpart node, the node cannot determine a keep alive status of the counterpart node. Accordingly, the node increases a transmission frequency of an echo request frame by one (N++) in step 205.

In contrast, if it is determined that the statistics information of the interfaces is received from the counterpart node, the node determines whether a statistics value included in the statistics information provided from the counterpart node increases in step 203. For example, the node determines whether the statistics value received in step 201 is greater than a previously received statistics value.

If it is determined in step 203 that the statistics value provided from the counterpart node increases, the node recognizes that traffic can be transmitted/received to/from the counterpart node via the data link. Accordingly, the node ends the present algorithm without performing a keep alive process for the counterpart node.

In contrast, if it is determined in step 203 that the statistics value provided from the counterpart node does not increase, the node cannot determine a keep alive status of the counterpart node. Accordingly, the node increases a transmission frequency N of an echo request frame by one (N++) in order to transmit the echo request frame in step 205.

The node compares a transmission frequency N of an echo request frame updated in step 205 with a maximum transmission frequency NMAX in order to determine whether to maintain a data link with the counterpart node in step 207.

If it is determined in step 207 that the transmission frequency N of an echo request frame is equal to or greater than the maximum transmission frequency $N_{MAX}$ ($N \geq N_{MAX}$), the node recognizes that the counterpart node cannot transmit/receive traffic. Accordingly, the node shuts down the data link with the counterpart node in step 215.

After that, the node ends the present algorithm. At this point, the node may set again a data link with the counterpart node.

In contrast, if it is determined in step 207 that the transmission frequency N of an echo request frame is smaller than the maximum transmission frequency $N_{MAX}$ ($N < N_{MAX}$), the node transmits an echo request frame to the counterpart node in order to determine a keep alive status of the counterpart node in step 209.

In step 211, the node determines whether an echo response frame in response to the echo request frame transmitted in step 209 is received.

If it is determined in step 211 that the echo response frame is not received within a reference time, the node returns to step 201 to determine whether statistics information of interfaces is received from the counterpart node. At this point, when a period for determining a keep alive status of the counterpart node arrives, the node determines whether statistics information of interfaces is received from the counterpart node.

In contrast, if it is determined in step 211 that the echo response frame is received, the node initializes a transmission frequency N of an echo request frame in step 213.

After that, the node ends the present algorithm.

In the above-described exemplary embodiment, a node including a protocol for controlling a data link updates a transmission frequency of an echo request frame before transmitting an echo request frame.

In other exemplary embodiments, a node including a protocol for controlling a data link may update a transmission frequency of an echo request frame after transmitting an echo request frame.

In addition, when a transmission frequency of an echo request frame is equal to or greater than a maximum transmission frequency, a node including a protocol for controlling a data link recognizes that a counterpart node cannot transmit/receive traffic. At this point, when a transmission frequency of an echo request frame is greater than the maximum transmission frequency depending on an initial value of the transmission frequency of an echo request frame, the node may recognize that the counterpart node cannot transmit/receive traffic.

Hereinafter, an exemplary construction of a node for transmitting a control packet for determining a keep alive status of a counterpart node to which a data link is connected is described.

Figure 3:
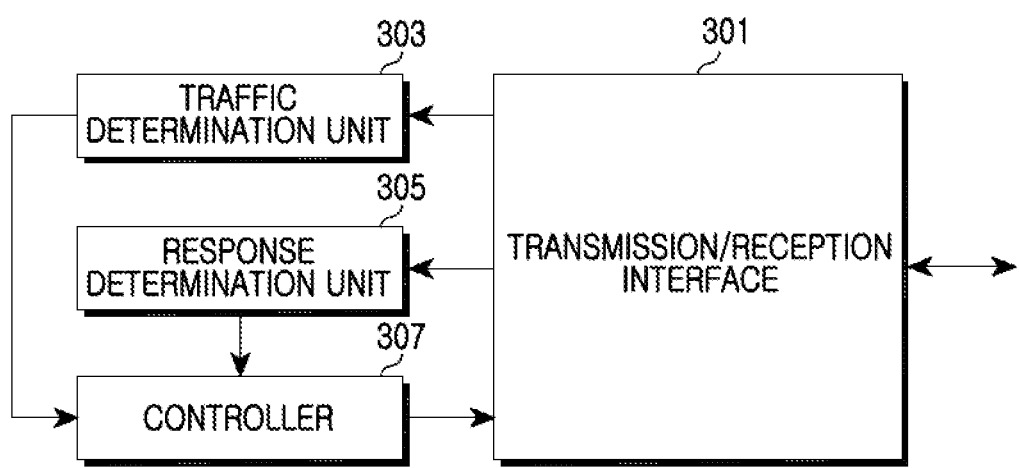
FIG. 3 is a block diagram illustrating a node for controlling transmission of a control packet in a broadband communication network according to an exemplary embodiment of the present invention.

FIG. 3 is a block diagram illustrating a node for controlling transmission of a control packet in a broadband communication network according to an exemplary embodiment of the present invention.

Referring to FIG. 3, the node for transmitting a control packet for determining a keep alive status of a counterpart node to which a data link is connected includes a transmission/reception interface 301, a traffic determination unit 303, a response determination unit 305, and a controller 307.

The transmission/reception interface 301 transmits/receives traffic to/from the counterpart node via the data link. At this point, the transmission/reception interface 301 may be divided into a transmission interface and a reception interface and use different links.

The traffic determination unit 303 determines whether a data packet is received from the counterpart node every period for determining a keep alive status of the counterpart node to which the data link is connected. For example, the traffic determination unit 303 determines whether statistics information of interfaces is received from the counterpart node. When the statistics information of interfaces is not received, the traffic determination unit 303 recognizes traffic is not received from the counterpart node. In contrast, when the statistics information of interfaces is received, the traffic determination unit 303 compares a statistics value included in statistics information received previously with a received statistics value to determine whether a statistics value increases. Here, the statistics value denotes information transmitted for PM by nodes.

When the statistics value does not increase, the traffic determination unit 303 recognizes that traffic has not been received from the counterpart node. When the statistics value increases, the traffic determination unit 303 recognizes that traffic has been received from the counterpart node.

The controller 307 determines whether to maintain the data link with the counterpart node by considering a transmission frequency of an echo request frame. For example, when the traffic determination unit 303 recognizes that traffic has not been received, the controller 307 compares a transmission frequency of an echo request frame with a maximum transmission frequency. When the transmission frequency of the echo request frame is equal to or greater than the maximum transmission frequency, the controller 307 recognizes that the counterpart node to which the data link is connected cannot transmit/receive traffic. Accordingly, the controller 307 shuts down the data link with the counterpart node.

In contrast, when the transmission frequency of the echo request frame is less than the maximum transmission frequency, the controller 307 recognizes that the counterpart node to which the data link is connected can transmit/receive traffic. Accordingly, the controller 307 controls to transmit an echo request frame to the counterpart node.

When the traffic determination unit 303 recognizes that traffic has been received, the controller 307 recognizes that it has determined keep alive information of the counterpart node and does not transmit an echo request frame.

The response determination unit 305 determines whether an echo response frame in response to the echo request frame transmitted by the node is received.

When the echo response frame is received, the response determination unit 305 initializes a transmission frequency of an echo request frame of the controller 307.

In the above-described exemplary embodiment of the present invention, the controller 307 increases the transmission frequency of the echo request frame before comparing the transmission frequency of the echo request frame with the maximum transmission frequency. In other exemplary embodiments, the controller 307 may increase the transmission frequency of the echo request frame after comparing the transmission frequency of the echo request frame with the maximum transmission frequency.

As described above, a node including a protocol for controlling a data link in a broadband communication network suspends transmission of a control packet used for a keep alive process while a signal is received from a counterpart node to which a link is connected, so that shut down of the link due to a loss of the control packet can be prevented and a bandwidth efficiency of the link can be increased.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a control signal for determining a keep alive status of a counterpart node in a broadband communication network, the method comprising:
   when a period for determining a keep alive status of the counterpart node to which a data link is connected arrives, determining whether traffic is received from the counterpart node;
   if it is determined that the traffic is received from the counterpart node, determining the keep alive status of the counterpart node using the traffic received from the counterpart node; and
   if it is determined that the traffic is not received from the counterpart node, transmitting a request signal for determining the keep alive status of the counterpart node to the counterpart node,
   wherein when the keep alive status of the counterpart node is determined using the traffic, the request signal is not transmitted to the counterpart node.

2. The method of claim 1, wherein the determining of whether the traffic is received comprises:
   determining whether statistics information of interfaces is received from the counterpart node;
   if it is determined that the statistics information is received, determining whether a statistics value of the statistics information received from the counterpart node is greater than a previously received statistics value; and
   if it is determined that the statistics value received from the counterpart node is greater than the previously received statistics value, recognizing that traffic is received from the counterpart node.

3. The method of claim 2, further comprising, if it is determined that the statistics value received from the counterpart node is not greater than the previously received statistics value, recognizing that traffic is not received from the counterpart node.

4. The method of claim 2, further comprising, if it is determined that the statistics information is not received from the counterpart node, recognizing that traffic is not received from the counterpart node.

5. The method of claim 1, wherein the request signal comprises an echo request signal.

6. The method of claim 1, wherein the transmitting of the request signal comprises:
   determining whether to transmit the request signal to the counterpart node with consideration of a transmission frequency of the request signal; and
   when determining to transmit the request signal, transmitting the request signal to the counterpart node.

7. The method of claim 6, further comprising:
   when determining not to transmit the request signal, shutting down the data link connected with the counterpart node.

8. The method of claim 6, wherein the determining of whether to transmit the request signal comprises:
   determining a transmission frequency of the request signal; and
   comparing the transmission frequency of the request signal with a maximum transmission frequency to determine whether to transmit the request signal.

9. The method of claim 6, further comprising:
   after the transmitting of the request signal to the counterpart node, if it is determined that a response signal in response to the request signal is received from the counterpart node, initializing the transmission frequency of the request signal.

10. The method of claim 6, further comprising:
    updating the transmission frequency of the request signal at least one of before transmitting the request signal and after transmitting the request signal.

11. An apparatus for transmitting a control signal for determining a keep alive status of a counterpart node in a broadband communication network, the apparatus comprising:
    a transmission/reception interface for transmitting/receiving traffic to/from the counterpart node to which a data link is connected;
    a traffic determination unit for determining whether traffic is received from the counterpart node; and
    a controller for, if it is determined that the traffic is received from the counterpart node, determining a keep alive status of the counterpart node using the traffic received from the counterpart node, and if it is determined that the traffic is not received from the counterpart node, controlling to transmit a request signal for determining the keep alive status of the counterpart node to the counterpart node,
    wherein when determining the keep alive status of the counterpart node using the traffic, the controller controls not to transmit the request signal to the counterpart node.

12. The apparatus of claim 11, wherein if it is determined that a statistics value of interfaces provided from the counterpart node is greater than a previously received statistics value, the traffic determination unit recognizes that traffic is received.

13. The apparatus of claim 11, wherein if it is determined that a statistics value of interfaces is not received from the counterpart node, the traffic determination unit recognizes that traffic is not received from the counterpart node.

14. The apparatus of claim 11, wherein if it is determined that a statistics value of interfaces provided from the counterpart node is not greater than a previously received statistics value, the traffic determination unit recognizes that traffic is not received from the counterpart node.

15. The apparatus of claim 11, wherein if it is determined that the traffic is not received from the counterpart node, the controller determines whether to transmit the request signal to the counterpart node with consideration of a transmission frequency of the request signal, and when determining to transmit the request signal to the counterpart node, controls to transmit the request signal to the counterpart node.

16. The apparatus of claim 15, wherein when determining not to transmit the request signal to the counterpart node, the controller controls to shut down the data link connected with the counterpart node.

17. The apparatus of claim 15, wherein the controller compares the transmission frequency of the request signal with a maximum transmission frequency to determine whether to transmit the request signal.

18. The apparatus of claim 15, wherein the controller updates the transmission frequency of the request signal at least one of before transmitting the request signal and after transmitting the request signal.

19. The apparatus of claim 11, further comprising:
a response determination unit for determining whether a response signal in response to the request signal transmitted by the controller is received, and if it is determined that the response signal is received, for initializing the transmission frequency of the request signal stored in the controller.

20. The apparatus of claim 11, wherein the request signal for determining the keep alive status of the counterpart node comprises an echo request signal.

\* \* \* \* \*